Jan. 14, 1930.  F. A. QUIROZ ET AL  1,743,620
VISCOSITY REGULATOR
Filed March 20, 1926  2 Sheets-Sheet 1

INVENTORS
J.P.Leask.
F.A.Quiroz.
BY
William R.Pratt
ATTORNEYS.

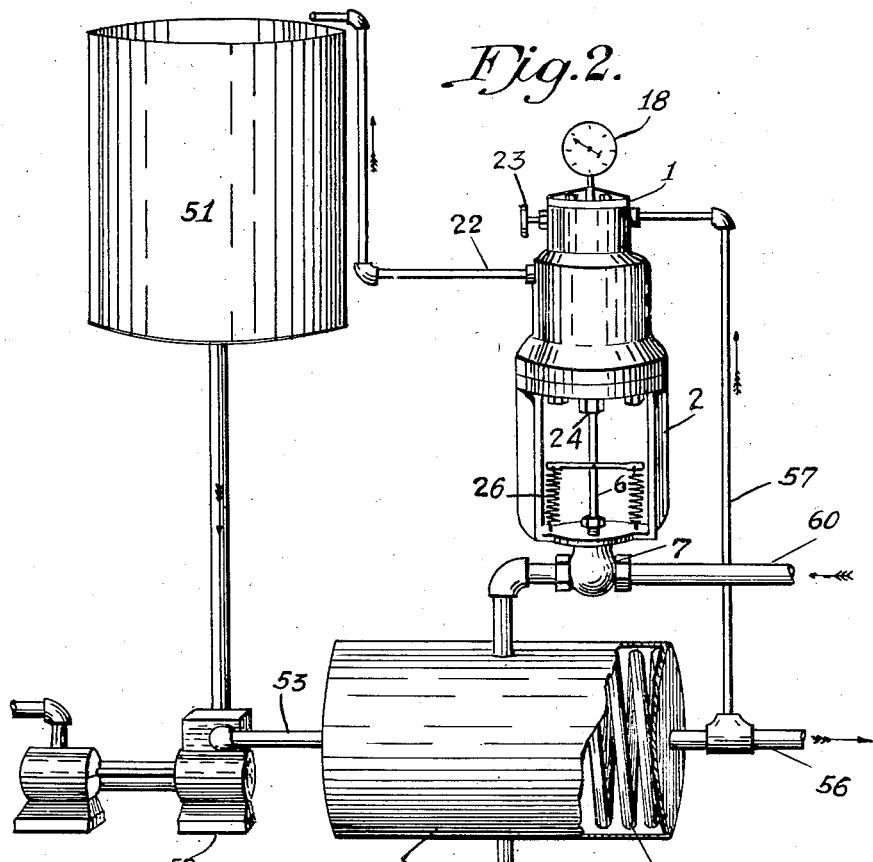
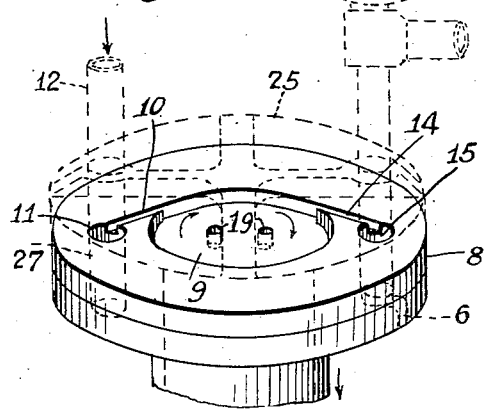

Patented Jan. 14, 1930

1,743,620

UNITED STATES PATENT OFFICE

FRANCISCO ANGEL QUIROZ, OF NEW YORK, N. Y., AND JOHN POLLOCK LEASK, OF GLENBROOK, CONNECTICUT, ASSIGNORS TO PEABODY ENGINEERING CORPORATION, A CORPORATION OF NEW YORK

VISCOSITY REGULATOR

Application filed March 20, 1926. Serial No. 96,264.

Our invention relates to devices for regulating the viscosity of fluids and has for its object the production of a regulator for use with fluids under pressure, that will remain in balance so long as the viscosity of the fluid remains constant, regardless of whether or not the fluid pressure varies, and which will automatically be thrown out of balance whenever there is a change in viscosity of the fluid, thereby regulating a source of heat applied to the fluid to bring the viscosity back to a point at which the regulator is again in balance.

Another object of our invention is to produce a regulator which may be adjusted so as to maintain the viscosity of a fluid constant at any predetermined amount desired, and which may easily be changed to hold the fluid constant at any other predetermined viscosity.

A further object of our invention is the maintenance of approximately constant viscosity of a fluid by applying more or less heat to the fluid and we accomplished this by using the principle that a decrease in viscosity of a fluid decreases the internal friction and therefore, under equivalent conditions of fluid pressure, results in an increase in the velocity of said fluid in passing through a conduit or a restriction; and vice versa, an increase in viscosity results in a decrease in the velocity of the fluid. In accomplishing these results we employ the following principles:

(1) Transformation of the kinetic energy in a moving fluid element into static pressure.

(2) The creation of a pressure due to centrifugal force produced by the rotation of a fluid inside a closed chamber.

(3) Utilization of the velocity of a fluid across the mouth of an orifice to increase the resistance opposed to the passage of the said fluid through the orifice.

The foregoing and other features of our invention will now be described in connection with the accompanying drawings forming part of this specification, in which we have represented our regulator in its preferred form, after which we will point out more particularly in the claims those features which we believe to be new and of our own invention.

In the drawings,

Figure 2 is a perspective view of our regulator with proper connections for fluid supply.

Figure 3 is a perspective view of the part of the regulator sensitive to viscosity.

Figure 1:
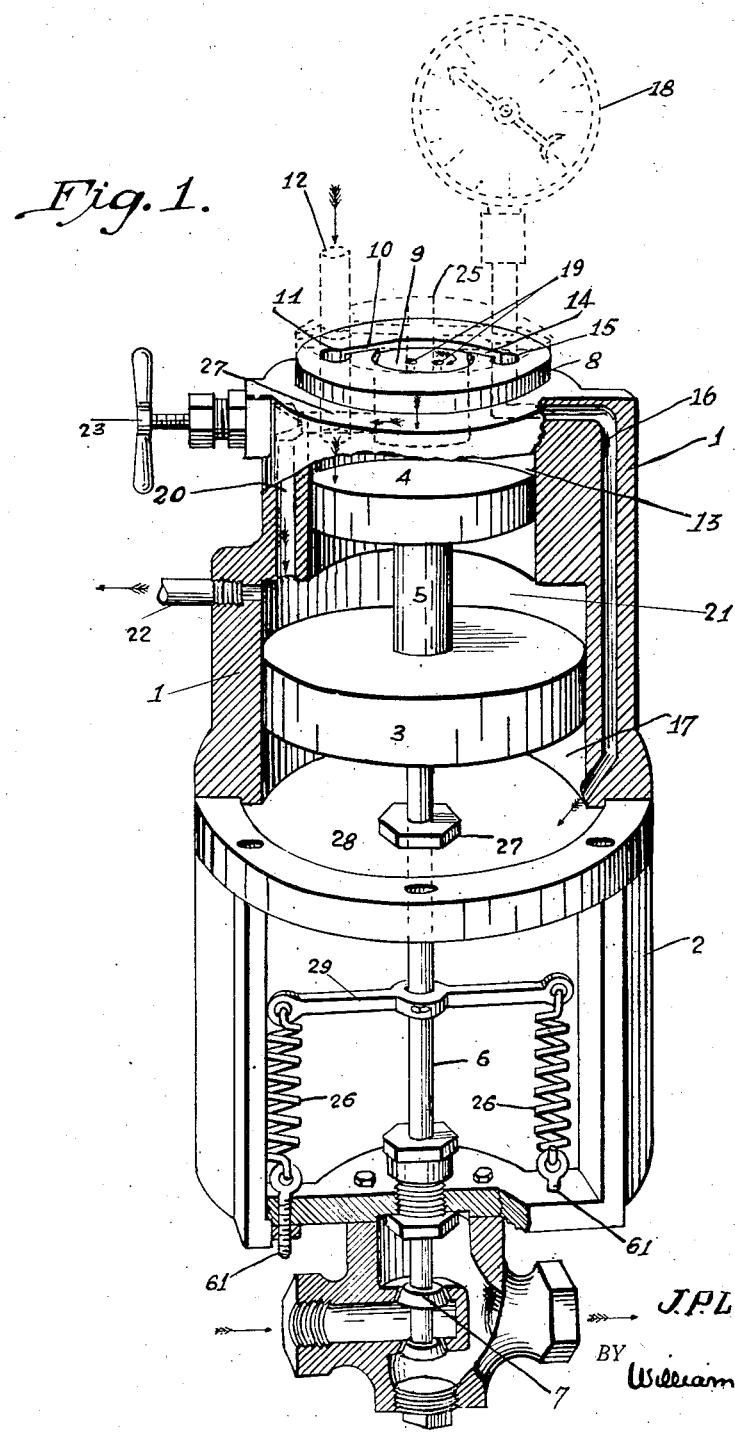
Figure 1 is a perspective view of our regulator, partly in section.

Our regulator shown in Figure 1 comprises a cylinder 1 mounted on a frame 2. In the cylinder 1 are operatively fitted two pistons 3 and 4 connected together by a piston rod 5 and communicating by means of a valve rod 6 to a balanced valve 7. These pistons are of different diameter so proportioned that the relative areas are approximately as two is to one. This ratio may be altered as will be hereinafter explained.

The cylinder 1 is divided into two portions forming two distinct connecting cylinders 13 and 17 of different diameters conforming respectively to the diameters of the two pistons 3 and 4. These two cylinders together with the two pistons form a chamber 21.

The upper end of cylinder 13 is entirely closed except for the passage 27 connecting with the chamber 11. The lower end of cylinder 17 is closed by a plate 28 connecting with, or integral with, the frame 2.

As shown at the top of the drawing of our regulator, Figure 1 and more clearly in Figure 3, we provide a disc 8, a central circular chamber 9 closed at the bottom, except for some small orifices, and two smaller chambers 11 and 15, which extend through the disc. Chamber 11 is connected with the central chamber 9 by a slot 10 the side of which is tangential to the periphery of chamber 9. Chamber 11 also connects with the inlet pipe 12 and by means of the passage 27 with the upper cylinder 13 in which is fitted the smaller piston 4. The chamber 15 is connected with the central chamber 9 by a slot 14 the side of which is tangential to the periphery of chamber 9 and on the opposite side to the slot 10. The chamber 15 is connected with a gauge 18 and also by a conduit 16 to the lower part of the cylinder 17 in which the larger piston 3 is fitted. In the bottom of the central chamber 9 we provide orifices or holes 19 which are connected by means of conduit 20, with the chamber 21 situated between the pistons 3 and 4. A regulating valve 23 controls the flow of the fluid through the conduit 20. A stuffing box 24 is provided in the plate 28 for the valve rod 6 in order to prevent any leakage of the fluid at this point. A cover 25 shown in the drawing by dotted lines, is provided to cover the disc 8 and to close the chambers therein.

On the valve rod 6, we provide a cross arm 29 with springs 26, the function of which is to prevent the valve 7 from fully opening or closing under a slight variation in pressure as hereinafter described.

It will be readily understood from the above description that fluid may enter the regulator at the inlet pipe 12, pass through the slot 10 and rotate in the chamber 9 and then pass through the orifices 19 to the passage 20 and finally to the outlet 22. This process will be accompanied by a lowering in pressure in passing through the slot 10. This reduced pressure which is modified by certain other factors will be transferred to the chamber 15. The first factor which modifies this pressure is the impact with which the moving or rotating column of fluid strikes against the entrance to slot 14. The second factor is the outward pressure due to centrifugal force of the fluid rotating in chamber 9. The third factor is the amount of resistance offered to the passage of the oil through the orifices 19 in leaving the chamber 9.

All these factors are affected by the velocity with which the fluid enters the chamber 9 through the slot 10. Thus a decrease in this velocity will lower the force of the impact against the entrance to slot 14 and in consequence lower the pressure in chamber 15. The reduced velocity of rotation will reduce the centrifugal force and therefore reduce the pressure exerted against the fluid in the slot 14 and chamber 15. The decreased velocity of the fluid moving across the orifices 19 will reduce the resistance offered to the escape of the fluid through the orifices 19 and this will again lower the pressure in slot 14 and chamber 15.

On the other hand an increase in the velocity of the fluid in the chamber 9 will increase each of these three factors. It is evident therefore that the drop in pressure between the chamber 11 and chamber 15 will be affected not only by the passage of the fluid through the slot 10 but also by these three factors all operating together and multiplying the effect.

We have found that in order to give greater sensitiveness in action the resistance to the flow of the fluid through the passage or slot 10 should be greater than that of the orifices 19. In practice we provide more exposed surface in the walls of the slot 10 than in the walls of the orifices 19.

Our regulator may be connected up for use in a fluid supply system as follows:

Referring to Figure 2 we provide a tank 51 in which the fluid may be stored. From this it is forced by a pump 52 through a pipe 53 to a heater 54 where the liquid passes through a coil 55 and pipe 56 to the point of consumption. If desired the pump may be fitted with a governor whereby the pressure of the fluid in the pipes 56 and 57 may be kept constant. A small pipe 57 carries a portion of the fluid to the regulator where it passes through the inlet 12 as shown in Figure 1 and discharges through pipe 22. It is immaterial whether this supply pipe 57 enters the regulator vertically as shown in Figure 1 or horizontally as indicated in Figure 2. Steam or other heating medium is supplied to the heater 54 from a source not shown in the drawing, through the pipe 60 in which the regulating valve 7 is located for the purpose of controlling the quantity of heat delivered to the heater as may be required.

The operation of the device is as follows:

Fluid under pressure (which may vary within wide limits) is made to flow through the inlet pipe 12 to the small chamber 11 and thence to the central chamber 9. At the same time the static pressure of the fluid in the chamber 11 is transmitted through the passage 27 to the upper cylinder 13 thus exerting a downward force on the piston 4.

The fluid on entering the central chamber 9 is given a whirling motion and passes out through the orifices 19 through conduit 20 and thence to the outlet pipe 22. The passage 27 is made sufficiently large so that no material variation in pressure takes place in pipe 20 which would tend to vary the back pressure on chamber 9. In like manner no material building up of pressure can occur in chamber 21.

When the fluid rotates with some velocity in the central chamber 9, it causes a pressure to be exerted in chamber 15 which is less than the pressure in chamber 11 and which varies with the kinetic energy of the fluid and also with its centrifugal force engendered by its rotation and also with the resistance offered to its escape through orifices 19. This resulting pressure is transmitted through conduit 16 to the chamber 17 where it exerts an upward pressure against piston 3. Thus the piston rod 5 carrying the two pistons and communicating with the valve rod 6 is subjected to two opposing forces, one up and the other down. The pistons and rods will remain stationary when these forces are balanced, and will move up or down, closing or opening the valve 7 according to whether these forces become unbalanced on one side or the other.

We have discovered that if the device be properly proportioned there will be a certain definite percentage drop in pressure between chambers 11 and 15 which will be independent of the inlet pressure but which will vary with the viscosity of the fluid and with the rate of flow through the regulator. Further that this percentage may be controlled to give a pressure in chamber 15 which will be approximately one half the pressure in 11. For this reason the ratio of the smaller piston to the larger is made approximately fifty per cent.

If a certain specified viscosity is required to be maintained, the valve 23 may be adjusted to give a rate of flow through the regulator which will keep the device in balance so long as the fluid possesses the required viscosity, but which will throw the device out of balance when the viscosity varies either way from this specified figure. Thus, by adjusting valve 23 the device can be made to maintain any degree of viscosity required.

Now it will be evident that if the relative area of the pistons 3 and 4 are made to correspond to the relative pressures in chambers 11 and 15, i. e., if the percentage of the area of the small piston to the area of the large piston is inversely proportional to the percentage which the pressure in chamber 15 bears to the pressure in chamber 11, the device will be in "balance", the higher pressure acting on the smaller area balancing the lower pressure on the larger area. There will then be no movement of the pistons nor the valve rod 6.

This balance will not be disturbed by a change in the supply pressure in chamber 11 for the reasons stated, i. e., the supply pressure may vary over wide limits without affecting the percentage relation of the lower pressure to the higher pressure and thus without disturbing the balance of opposing forces on the pistons and so without causing any movement of the valve 7.

If, however, a change in viscosity of the liquid occurs, the pressure relation will immediately change and throw the device out of balance. Thus, if the viscosity increases the relative pressure drop between chambers 11 and 15, that is the pressure differential, will be increased and the pistons will move down, opening the valve and admitting more heating medium to the heater. This will reduce the viscosity of the liquid to a point at which the balance will be again established, when valve 7 will take a neutral position. Vice versa, if the viscosity decreases the relative pressure drop or pressure differential will be reduced and the pistons will move up, partially closing the valve 7.

In order to secure sensitive operation of the device, it is desirable to cause the valve 7 to move in small increments. For that reason we introduce the springs 26. When the regulator is in balance these springs are under some tension, the relative area of the two pistons being modified slightly to balance this downward pull. If the viscosity decreases and the pistons move upward as explained above, the tension on the springs will be increased above the normal, and this increased downward pull will balance the device after a short movement of the pistons, i. e., the movement upward will cease after the valve 7 has partially closed. If this reduced opening of the valve is sufficient to bring the viscosity back to normal, there will be no further upward movement, but if the viscosity still continues to drop, the pistons will again become unbalanced and move upward till increased tension on the springs brings them to rest. In the case of a downward movement the operation is the same, except that it is accompanied by a reduction in the tension of the springs which tends to establish a balance of pressure as before.

The valve 23 for regulating the normal flow of liquid through the regulator possesses three functions. First, it will compensate by a slight adjustment for a possible error in machining the two cylinders, and a consequent variation in area of the pistons. Second, it will compensate for the tension of the springs although the tension of the latter may also be adjusted by means of the screws 61. Third, it will permit the regulator to be set for any one of a variety of viscosities. To illustrate the latter point; a definite setting of the valve 23 will adjust the flow to give a normal balance for a certain definite viscosity which will thereafter automatically be maintained. But if the setting of the valve 23 be altered a new viscosity will be established as the normal viscosity at which the device will assume a balance. This renders the device readily available for different sorts of service.

While the device described is in the form preferred by us it is understood that modifications may be made therein. For example diaphragms or metal bellows may be substituted for the pistons and two separate cylinders and pistons may be substituted for the single cylinder having two compartments and a single piston rod carrying two pistons. Also the intake and the outlet pipes may be rearranged. Furthermore while the words "up" and "down" have been used in the description it is obvious that the device will operate in the reverse position or horizontally, or in any intermediate position. These and other variations can be made without departing from the spirit of the invention, which is to be regarded as limited only by the scope of the appended claims.

We claim as our invention:

1. In a viscosity regulator, means for supplying a fluid thereto under an inlet pressure, a device sensitive to viscosity in which the pressure of the fluid is lowered, and means for balancing the lower pressure against the inlet pressure, said pressures operating to maintain the viscosity of the fluid at a predetermined point.

2. In a viscosity regulator, a fluid inlet, means for supplying a fluid thereto under variable pressure, a device sensitive to viscosity in which the pressure of the fluid is lowered and varied in proportion to the inlet pressure, and means for balancing said pressures to maintain the viscosity of the fluid at a predetermined point.

3. A viscosity regulator which comprises a circular chamber provided with an inlet, an outlet at approximate right angles thereto, means for passing a fluid through said chamber and imparting a rotary motion to the fluid within the chamber, a duct leading from said chamber, and means to utilize the pressure developed in the duct to control the viscosity of the fluid.

4. A viscosity regulator which comprises a circular chamber provided with a tangential inlet at right angles to the axis of the chamber and outlets parallel to the axis of the chamber, a duct or slot leading from said chamber, means for passing a fluid through the chamber with a whirling movement to create a pressure in said duct, and means operated by the variation of pressure within the duct with relation to the pressure in the chamber to vary the viscosity of the fluid.

5. A viscosity regulator which comprises a device sensitive to viscosity, means for supplying a fluid under pressure, means for balancing the difference in pressures on either side of the device sensitive to viscosity, and means operated by said device to maintain the viscosity of the fluid at a predetermined point.

6. In apparatus for regulating the viscosity of a fluid, including a heater for the fluid and a valve for controlling the fuel supply to the heater, means for delivering the fluid to a device sensitive to viscosity, means in connection with said device to impart a whirling motion to the fluid therein, and means for balancing the difference of pressure on either side of the device sensitive to viscosity to regulate the heat supply.

7. In apparatus for regulating the viscosity of a fluid, a viscosity responsive valve structure, including a valve for regulating a heater fuel supply comprising a movable member for operating the valve, means for admitting fluid under pressure to the apparatus and for transmitting the pressure to the opposite sides of the member, and means in connection with one of said transmitting means for reducing the pressure therein.

8. In a device of the class described, means for supplying fluid, a heater for the fluid, regulating means for the heater, and means responsive to changes in viscosity of the fluid leaving the heater for operating the regulating means, said means including a valve normally held in balance by the viscosity responsive means, and a spring to oppose to the closing movement of the valve a gradually increasing resistance.

9. A viscosity regulator comprising a casing having two sections differing in diameter, a piston in each of said sections, a chamber with a fluid inlet and a fluid outlet, a connection between the inlet and the smaller of said sections, a connection between the outlet and the larger of said sections, means whereby a pressure differential may be set up between said inlet and outlet to thereby move said pistons when the pressure is unbalanced, to control the viscosity of the fluid.

10. A viscosity regulator comprising a casing having two sections differing in diameter, a piston in each of said sections, a chamber with a fluid inlet and a fluid outlet, means for passing a fluid through said chamber and for setting up a pressure differential between the inlet and outlet, ducts connecting the fluid inlet and outlets of said chamber with the said sections to effect a movement of the pistons therein when the pressure is unbalanced, to control the viscosity of the fluid.

11. A viscosity regulator comprising a casing having two sections each with a piston therein and differing in diameter, a chamber having a fluid inlet and a fluid outlet, means for creating a pressure drop varying with the viscosity and rate of flow of the fluid between the inlet and outlet, and means for utilizing the pressure differential between the inlet and outlet of said chamber to effect a movement of said pistons to control the viscosity of the fluid.

12. A viscosity regulator comprising a casing having a plurality of cylindrical sections differing in diameter, a piston in each of said sections, a chamber having a fluid inlet and a fluid outlet, means for creating a pressure differential between the inlet and outlet and for transmitting such pressure to said pistons to control the viscosity of the fluid.

In testimony whereof we affix our signatures.

FRANCISCO ANGEL QUIROZ.
JOHN POLLOCK LEASK.